United States Patent
Davis et al.

(10) Patent No.: US 9,163,522 B2
(45) Date of Patent: Oct. 20, 2015

(54) SPRING CARRIER AND REMOVABLE SEAL CARRIER

(75) Inventors: Todd A. Davis, Tolland, CT (US); David Joseph Hierl, Coventry, CT (US)

(73) Assignee: United Technologies Corporation, Hartford, CT (US)

(*) Notice: Subject to any disclaimer, the term of this patent is extended or adjusted under 35 U.S.C. 154(b) by 60 days.

(21) Appl. No.: 13/590,319

(22) Filed: Aug. 21, 2012

(65) Prior Publication Data

US 2014/0054862 A1  Feb. 27, 2014

(51) Int. Cl.
| | |
|---|---|
| *F16J 15/16* | (2006.01) |
| *F01D 11/02* | (2006.01) |
| *F02C 7/28* | (2006.01) |
| *F16J 15/34* | (2006.01) |

(52) U.S. Cl.
CPC .............. *F01D 11/025* (2013.01); *F02C 7/28* (2013.01); *F16J 15/3452* (2013.01); *F16J 15/3464* (2013.01); *F05D 2260/38* (2013.01); *Y10T 29/49815* (2015.01)

(58) Field of Classification Search
CPC .... F16J 15/3436; F16J 15/344; F16J 15/3464
USPC .................................. 277/358, 370, 377, 379
See application file for complete search history.

(56) References Cited

U.S. PATENT DOCUMENTS

| | | | |
|---|---|---|---|
| 2,990,202 A * | 6/1961 | Dennison | 277/399 |
| 3,018,113 A * | 1/1962 | Hall | 277/413 |
| 3,445,119 A | 5/1969 | Andresen et al. | |
| 4,114,900 A | 9/1978 | Wiese | |
| 4,928,978 A | 5/1990 | Shaffer et al. | |
| 5,014,999 A | 5/1991 | Makhobey | |
| 5,174,584 A | 12/1992 | Lahrman | |
| 5,537,813 A | 7/1996 | Davis et al. | |
| 5,622,438 A | 4/1997 | Walsh et al. | |
| 6,196,790 B1 * | 3/2001 | Sheridan et al. | 415/111 |
| 6,216,458 B1 | 4/2001 | Alger et al. | |
| 6,402,369 B1 | 6/2002 | Ludington et al. | |
| 7,648,143 B2 | 1/2010 | Davis et al. | |
| 7,754,350 B2 | 7/2010 | Freling et al. | |
| 7,878,756 B2 | 2/2011 | Davis et al. | |
| 7,985,703 B2 | 7/2011 | Freling | |
| 8,187,989 B2 | 5/2012 | Freling | |
| 8,210,316 B2 | 7/2012 | DiBenedetto et al. | |
| 2003/0184022 A1 * | 10/2003 | Brauer et al. | 277/412 |
| 2007/0085278 A1 | 4/2007 | Davis et al. | |

(Continued)

FOREIGN PATENT DOCUMENTS

| | | |
|---|---|---|
| EP | 1835046 A1 | 9/2007 |
| EP | 1852520 A1 | 11/2007 |

(Continued)

OTHER PUBLICATIONS

International Search Report and Written Opinion from PCT Application Serial No. PCT/US2013/055725; dated Jun. 2, 2014, 11 pages.

*Primary Examiner* — Gilbert Lee
(74) *Attorney, Agent, or Firm* — Kinney & Lange, P.A.

(57) ABSTRACT

A seal assembly includes a seal support, a spring carrier, a plurality of springs, and a seal carrier. The spring carrier is connected to the seal support by a guide assembly. The plurality of springs are disposed between the seal support and the spring carrier. The seal carrier is connected to the spring carrier and is removable therefrom.

17 Claims, 3 Drawing Sheets

(56) References Cited

U.S. PATENT DOCUMENTS

| | | |
|---|---|---|
| 2007/0096399 A1 | 5/2007 | Miller et al. |
| 2007/0216107 A1 | 9/2007 | Freling |
| 2007/0259194 A1 | 11/2007 | Freling et al. |
| 2008/0134657 A1 | 6/2008 | DiBenedetto et al. |
| 2009/0110545 A1 | 4/2009 | Davis et al. |
| 2010/0296947 A1 | 11/2010 | DiBenedetto et al. |
| 2011/0047959 A1 | 3/2011 | DiBenedetto |
| 2011/0233871 A1 | 9/2011 | Davis |
| 2011/0248451 A1 | 10/2011 | Freling |
| 2011/0284103 A1 | 11/2011 | Davis et al. |
| 2011/0286836 A1 | 11/2011 | Davis |
| 2012/0186270 A1 | 7/2012 | Tatman et al. |
| 2012/0195753 A1 | 8/2012 | Davis et al. |
| 2012/0205874 A1 | 8/2012 | Freling |
| 2012/0260669 A1 | 10/2012 | Davis et al. |
| 2012/0263578 A1 | 10/2012 | Davis et al. |

FOREIGN PATENT DOCUMENTS

| | | |
|---|---|---|
| EP | 2299092 A2 | 3/2011 |
| EP | 1835046 B1 | 1/2012 |
| EP | 1852520 B1 | 5/2012 |
| GB | 2216964 A | 10/1989 |
| JP | H09267115 A | 10/1997 |

* cited by examiner

SPRING CARRIER AND REMOVABLE SEAL CARRIER

BACKGROUND

The present invention relates to gas turbine engines, and more particularly to seals for bearing compartments of gas turbine engines.

The rotating shafts and other rotating turbomachinery of gas turbine engines are supported from a non-rotating structure by arrays of anti-friction bearings. In many engines, anti-friction bearings are enclosed in bearing compartments that allow the anti-friction bearings to be more easily lubricated and cooled.

Bearing compartments can be sealed around the shaft by various types of seals including a seal assembly with a carbon seal and a seal plate. The seal plate is mounted on the shaft to rotate therewith and has a contact face which engages and interfaces with the fixed carbon seal. The carbon seal is movable (axially relative to the shaft) against and away from the seal plate by springs and/or air pressure. Typically, the interfacing surfaces that comprise the contact face of the seal plate and the contact face of the carbon seal are lubricated to minimize friction and wear.

In typical legacy carbon seal designs, a translating seal carrier is not removable (in-situ) without removing the entire seal assembly. Therefore, additional engine hardware is required to be removed/inspected/replaced when there is an engine problem associated only with the carbon seal.

SUMMARY

A seal assembly includes a seal carrier and a spring carrier. The seal carrier is connected to the spring carrier and is removable therefrom.

In another aspect, a seal assembly includes a seal support, a spring carrier, a plurality of springs, and a seal carrier. The spring carrier is connected to the seal support by a guide assembly. The plurality of springs are disposed between the seal support and the spring carrier. The seal carrier is connected to the spring carrier and is removable therefrom.

In yet another aspect, a method of removing a carbon face seal from a gas turbine engine, the method provides a seal carrier connected to a spring carrier. The seal carrier has the carbon face seal disposed therein. The method removes one or more fasteners that connect the seal carrier to the spring carrier from the assembly. The seal carrier is removed from the spring carrier without removal of springs and a guide assembly that connect the spring carrier to a seal support.

DETAILED DESCRIPTION

The invention relates to seal assembly designs for air to oil applications within a gas turbine engine. The seal assembly creates a seal between a rotor component and a stator component that provides for easier and quicker assembly and disassembly of the seal assembly itself. This improves overall engine maintainability metrics (reduces time and complexity) and reduces costs associated with engine maintenance. More particularly, the seal assembly includes a separate spring carrier that allows a seal carrier (and the carbon face seal) to be removed from the engine for inspection and replacement without the removal of additional hardware such as springs and fasteners. Additionally, incorporating the spring carrier into the seal assembly design allows the carbon face seal to be removed with the reduced possibility of foreign object damage to the gas turbine engine due to loose or lost springs and fasteners.

Figure 1:
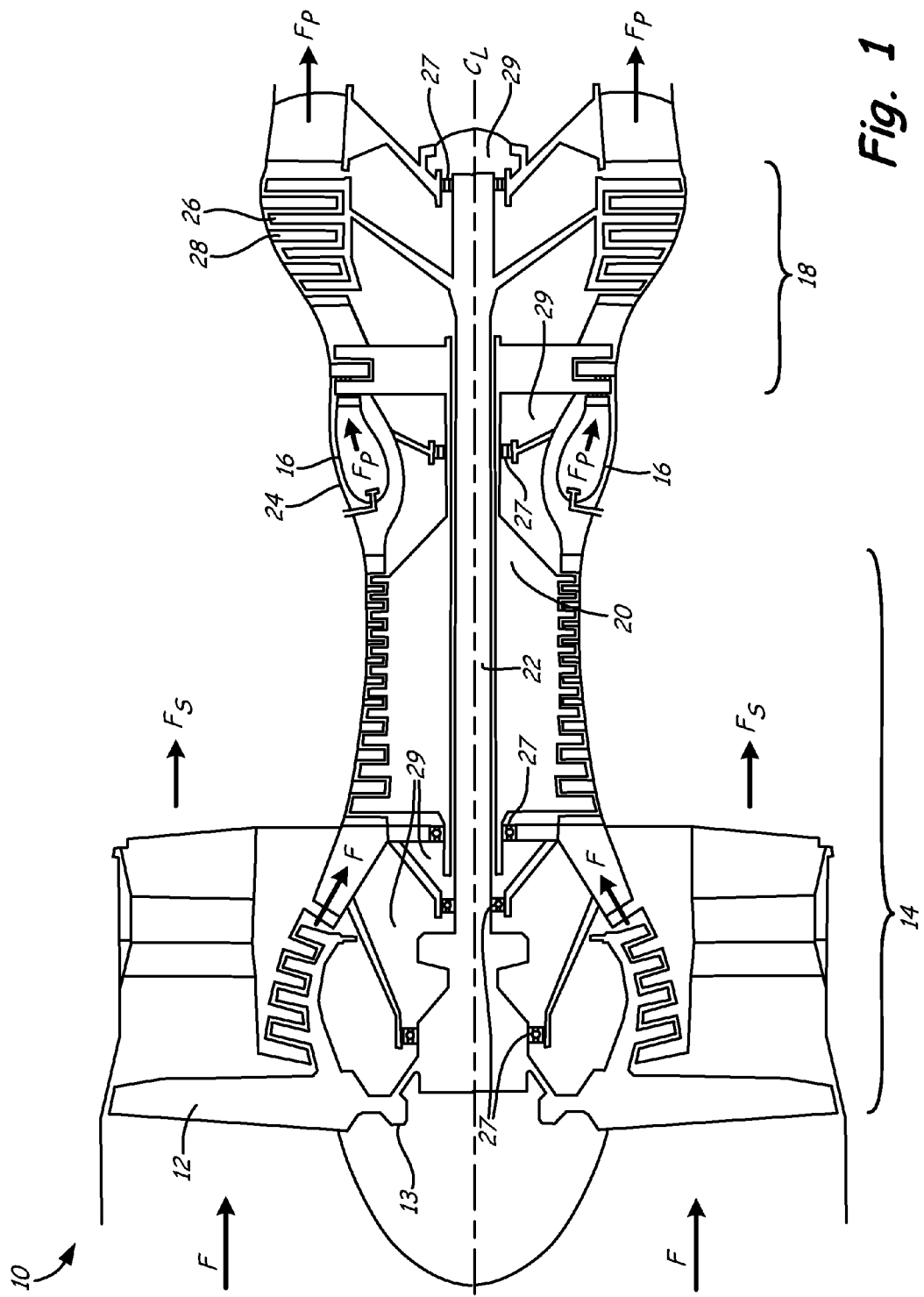
FIG. 1 is a longitudinal sectional view along an engine center line of a gas turbine engine.

FIG. 1 is a representative illustration of a gas turbine engine 10 including a seal assembly of the present invention. The view in FIG. 1 is a longitudinal sectional view along an engine center line. FIG. 1 shows gas turbine engine 10 including a fan blade 12, a compressor 14, a combustor 16, a turbine 18, a high-pressure rotor 20, a low-pressure rotor 22, and an engine casing 24. Turbine 18 includes rotor stages 26 and stator stages 28. Gas turbine engine 10 rotor and stator components interface on bearings 27 disposed in bearing compartments 29.

As illustrated in FIG. 1, fan blade 12 extends from fan hub, which is positioned along engine center line $C_L$ near a forward end of gas turbine engine 10. Compressor 14 is disposed aft of fan blade 12 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan blade 12. Rotor stages 26 and stator stages 28 are arranged throughout turbine 18 in alternating rows. Rotor stages 26 connect to high-pressure rotor 20 and low-pressure rotor 22. Engine casing 24 surrounds turbine engine 10 providing structural support for compressor 14, combustor 16, and turbine 18, as well as containment for cooling air flows, as described below. Bearings 27 are disposed along the axial length of rotor components such as low-pressure rotor 22 and high-pressure rotor 20 within bearing compartments 29.

In operation, air flow F enters compressor 14 after passing between fan blades 12. Air flow F is compressed by the rotation of compressor 14 driven by high-pressure turbine 18. The compressed air from compressor 14 is divided, with a portion going to combustor 16, and a portion employed for cooling components, buffering, and other purposes. Compressed air and fuel are mixed and ignited in combustor 16 to produce high-temperature, high-pressure combustion gases Fp. Combustion gases Fp exit combustor 16 into turbine section 18. Stator stages 28 properly align the flow of combustion gases Fp for an efficient attack angle on subsequent rotor stages 26. The flow of combustion gases Fp past rotor stages 26 drives rotation of both low-pressure rotor 22 and high-pressure rotor 20. High-pressure rotor 20 drives a high-pressure portion of compressor 14, as noted above, and low-pressure rotor 22 drives fan blades 12 to produce thrust Fs from gas turbine engine 10. Rotor components such as low-pressure rotor 22 and high-pressure rotor 20 are supported within gas turbine engine 10 on stator components by bearings 27. Bearings 27 are disposed within bearing compartments 29, which are used to contain lubricating oil for bearings 27 operation. Although embodiments of the present invention are illustrated for a turbofan gas turbine engine for aviation use, it is understood that the present invention applies to other aviation gas turbine engines and to industrial gas turbine engines as well.

Figure 2:
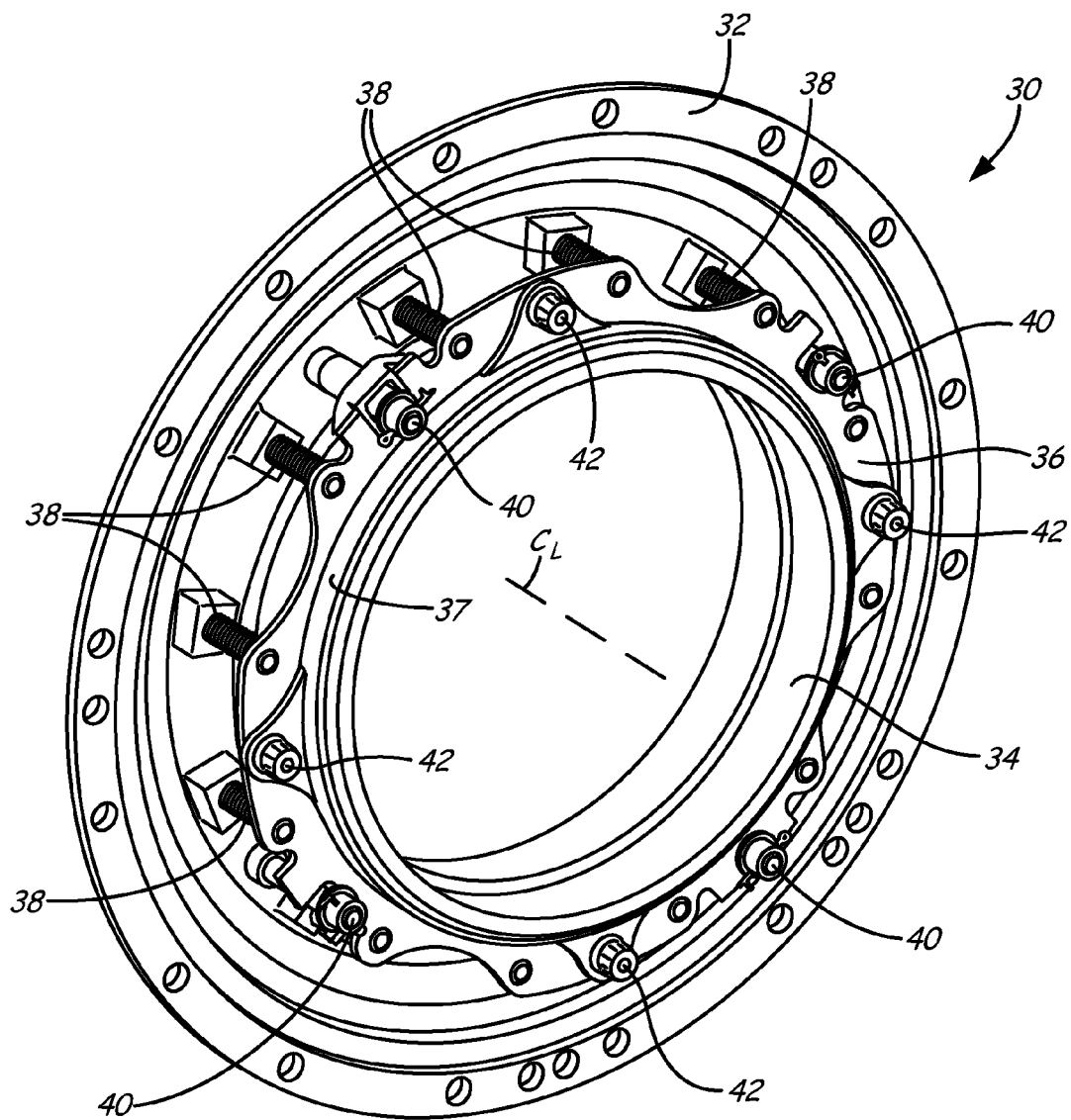
FIG. 2 is a perspective view of one embodiment of a seal assembly with a separate removable spring carrier.

FIG. 2 shows a first embodiment of a seal assembly 30 that includes a seal support 32, a face seal 34, a spring carrier 36, a seal carrier 37, springs 38, guide assemblies 40, and fasteners 42.

Seal support 32 comprises a stator portion of gas turbine engine 10 such as a portion of a housing of bearing compartment 29 (FIG. 1). Seal support 32 has an annular shape and is disposed around engine centerline axis $C_L$ of gas turbine engine 10. Face seal 34 is disposed adjacent seal support 32 and extends away therefrom around engine centerline axis $C_L$. In one embodiment, face seal 34 is comprised of carbon and that interfaces with a rotor component of gas turbine engine 10 such as a seal plate (not shown). In one embodiment, face seal 34 is press fit into seal carrier 37.

In the embodiment shown in FIG. 2, spring carrier 36 comprises an arcuate ring that is adapted to be disposed around an outer circumference of the seal carrier 37. Thus, spring carrier 36 is arranged around an open central cavity. Spring carrier 36 is connected to and disposed at a distance from seal support 32. Springs 38 are disposed in the distance between seal support 32 and spring carrier 36. Springs 38 contact seal support 32 and spring carrier 36 but do not contact seal carrier 37 or face seal 34. Spring carrier 36 is retained to seal support 32 by guide assemblies 40.

Seal carrier 37 is received in the open central cavity of spring carrier 36 and abuts a first side surface of the spring carrier 36. In particular, seal carrier 37 has tab projections 54 (FIG. 3) extending generally radially therefrom. Each tab projection 54 (FIG. 3) is adapted to abut spring carrier 36 and receive fastener 42 therein to connect seal carrier 37 to the spring carrier 36.

In operation, face seal 34 is supported by spring carrier 36 and seal carrier 37. Face seal 34 rides against seal plate (not shown) to regulate the flow of buffer air into bearing compartment 29 (FIG. 1). Spring carrier 36, seal carrier 37, and face seal 34 are biased into engagement position by springs 38. Guide assembly 40 keeps components such as spring carrier 36, seal carrier 37, and springs 38 from rotating due to torque applied from the rotor component (i.e. the seal plate) but allows for axial translational movement.

When seal assembly 30 is disassembled for inspection and possible component replacement, spring carrier 36 retains springs 38 and guide assembly 40 so that these components do not need to be removed with the removal of seal carrier 37 and face seal 34. Thus, the disassembly process is simplified such that maintenance personnel need only remove fasteners 42 that connect the seal carrier 37 to the spring carrier 36. Once the fasteners 42 are removed, the seal carrier 37 (along with the face seal 34) can then be removed from the spring carrier 36.

Figure 3:
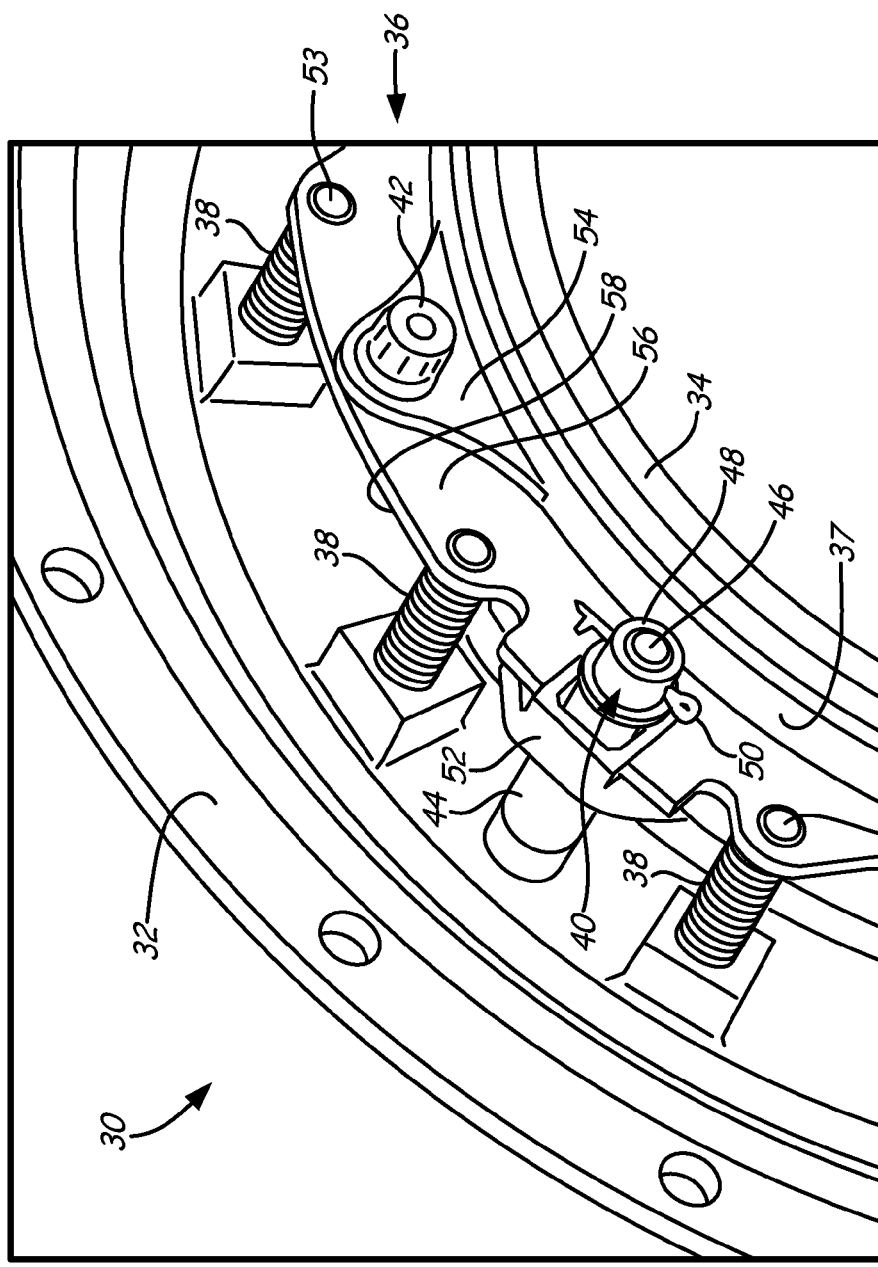
FIG. 3 is an enlarged perspective view of the seal assembly of FIG. 2.

FIG. 3 shows a portion of seal assembly 30. In addition to seal support 32, face seal 34, spring carrier 36, seal carrier 37, springs 38, guide assemblies 40, and fasteners 42, seal assembly 30 includes various components of guide assemblies 40 and pins 53. Each guide assembly includes a guide sleeve 44, a guide pin 46, a nut 48, a cotter pin 50, and a bracket 52.

As discussed previously, spring carrier 36 is connected to seal support 32 by guide assembly 40. Guide sleeve 44 abuts seal support 32 and is arranged around guide pin 46. Guide pin 46 extends from seal support 32 past a first side surface 56 of spring carrier 36. Nut 48 installs onto guide pin 46 and acts to limit axial travel of spring carrier 36. In one embodiment, nut 48 and guide pin 46 include holes that receive cotter pin 50 therein. Thus, cotter pin 50 extends through both nut 48 and guide pin 46 and provides for a locking element. A portion of bracket 52 is received in a slot in spring carrier 36. Second portions of bracket 52 abut a second side surface 58 of the spring carrier 36. Bracket 52 is adapted with a central cavity to receive guide sleeve 44 and guide pin 46 therethrough.

Pins 53 extend through spring carrier 36. In particular, pins 53 are retained within spring carrier 36 and are received in a counterbore in seal support 32. Pins 53 extend through the open inner diameter of springs 38 with a loose fit and act to retain springs 38 in a position contacting spring carrier 36 even as torque load is applied to face seal 34.

The invention relates to seal assembly designs for air to oil applications within a gas turbine engine. The seal assembly creates a seal between a rotor component and a stator component that provides for easier and quicker assembly and disassembly of the seal assembly itself. This improves overall engine maintainability metrics (reduces time and complexity) and reduces costs associated with engine maintenance. More particularly, the seal assembly includes a separate spring carrier that allows a seal carrier (and the carbon face seal) to be removed from the engine for inspection and replacement without the removal of additional hardware such as springs and fasteners. Additionally, incorporating the spring carrier into the seal assembly design allows the carbon face seal to be removed with the reduced possibility of foreign object damage to the gas turbine engine due to loose or lost springs and fasteners.

Discussion of Possible Embodiments

The following are non-exclusive descriptions of possible embodiments of the present invention.

A seal assembly includes a seal carrier and a spring carrier. The seal carrier is connected to the spring carrier and is removable therefrom.

The seal assembly of the preceding paragraph can optionally include, additionally and/or alternatively, any one or more of the following features, configurations and/or additional components:

a further embodiment of the foregoing seal assembly, wherein the seal carrier is received in and abuts a first side of the spring carrier.

a further embodiment of the foregoing seal assembly, wherein seal carrier has a tab projection adapted to receive a fastener to connect the seal carrier to the spring carrier.

a further embodiment of the foregoing seal assembly, wherein the spring carrier comprises an arcuate ring that is adapted to be disposed around an outer circumference of the seal carrier.

a further embodiment of the foregoing seal assembly, wherein the seal assembly further includes a seal support, a plurality of springs disposed between the seal support, and a second side of the spring carrier.

a further embodiment of the foregoing seal assembly, wherein the spring carrier is connected to the seal support by a guide assembly.

a further embodiment of the foregoing seal assembly, wherein the guide assembly includes a guide sleeve arranged around a guide pin.

a further embodiment of the foregoing seal assembly, wherein the guide assembly includes a nut and a cotter pin, wherein the nut fastens to the guide pin and the nut and guide pin include holes that receive the cotter pin therein.

a further embodiment of the foregoing seal assembly, wherein the guide assembly includes a bracket that is adapted to receive the guide sleeve and guide pin therethrough, and wherein a portion of the bracket abuts the second side of the spring carrier.

a further embodiment of the foregoing seal assembly, wherein a carbon face seal is press fit into the seal carrier.

a further embodiment of the foregoing seal assembly, wherein the seal assembly includes a seal support, a spring carrier, a plurality of springs, and a seal carrier. The spring carrier is connected to the seal support by a guide assembly. The plurality of springs are disposed between the seal support and the spring carrier. The seal carrier is connected to the spring carrier and is removable therefrom.

a further embodiment of the foregoing seal assembly, wherein the seal carrier is received in and abuts a first side of the spring carrier.

a further embodiment of the foregoing seal assembly, wherein the seal carrier has a tab projection adapted to receive a fastener to connect the seal carrier to the spring carrier.

a further embodiment of the foregoing seal assembly, wherein the spring carrier comprises an arcuate ring that is adapted to be disposed around an outer circumference of the seal carrier.

a further embodiment of the foregoing seal assembly, wherein the guide assembly includes a guide pin affixed to the seal support, a guide sleeve arranged around a guide pin, and a bracket that is adapted to receive the guide sleeve and guide pin therethrough. A portion of the bracket abuts the second side of the spring carrier.

a further embodiment of the foregoing seal assembly, wherein the guide assembly includes a nut and a cotter pin, wherein the nut fastens to the guide pin and the nut and guide pin include holes that receive the cotter pin therein.

a further embodiment of the foregoing seal assembly, wherein a carbon face seal press fit into the seal carrier.

a further embodiment of the foregoing seal assembly, wherein a method of removing a carbon face seal from a gas turbine engine is provided. The method utilizes a seal carrier connected to a spring carrier. The seal carrier has the carbon face seal disposed therein. The method removes one or more fasteners that connect the seal carrier to the spring carrier from the assembly. The seal carrier is removed from the spring carrier without removal of springs and a guide assembly that connect the spring carrier to a seal support.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly comprising:
   a seal carrier;
   a carbon face seal directly press fit into an opening or groove of the seal carrier;
   a spring carrier, wherein the seal carrier is removably connected to the spring carrier;
   a support to which the spring carrier is connected; and
   a plurality of springs extending between the support and the spring carrier such that the spring carrier is biased by the plurality of springs, and wherein the springs can remain engaged to both the support and the spring carrier when the seal carrier is removed from the spring carrier.

2. The seal assembly of claim 1, wherein the seal carrier is received in and abuts a first side of the spring carrier.

3. The seal assembly of claim 2, wherein the seal carrier has a tab projection adapted to abut the first side of the spring carrier, and wherein the tab projection receives a fastener to connect the seal carrier to the spring carrier.

4. The seal assembly of claim 1, wherein the spring carrier comprises an arcuate ring that is adapted to be disposed around an outer circumference of the seal carrier.

5. The seal assembly of claim 1, wherein the spring carrier is connected to the support by a guide assembly.

6. The seal assembly of claim 5, wherein the guide assembly includes a guide sleeve arranged around a guide pin.

7. The seal assembly of claim 6, wherein the guide assembly includes a nut and a cotter pin, wherein the nut fastens to the guide pin, and wherein the nut and guide pin include holes that receive the cotter pin therein.

8. The seal assembly of claim 6, wherein the guide assembly includes a bracket that is adapted to receive the guide sleeve and guide pin therethrough, and wherein a portion of the bracket abuts the second side of the spring carrier.

9. The seal assembly of claim 1, wherein the carbon face seal is press fit into an inner diameter portion of the seal carrier, and wherein the carbon face seal faces radially inward.

10. A seal assembly comprising:
    a support;
    a spring carrier connected to the support by a guide assembly;
    a plurality of springs disposed between the support and the spring carrier;
    a seal carrier, wherein the seal carrier is connected to the spring carrier and is removable therefrom without disturbing the support, plurality of springs or the spring carrier; and
    a carbon face seal, wherein the carbon face seal is directly press fit into an opening or groove of the seal carrier.

11. The seal assembly of claim 10, wherein the seal carrier is received in and abuts a first side of the spring carrier.

12. The seal assembly of claim 10, wherein the seal carrier has a tab projection adapted to receive a fastener to connect the seal carrier to the spring carrier.

13. The seal assembly of claim 10, wherein the spring carrier comprises an arcuate ring that is adapted to be disposed around an outer circumference of the seal carrier.

14. The seal assembly of claim 10, wherein the guide assembly includes:
    a guide pin affixed to the support;
    a guide sleeve arranged around a guide pin; and
    a bracket that is adapted to receive the guide sleeve and guide pin therethrough, and wherein a portion of the bracket abuts the second side of the spring carrier.

15. The seal assembly of claim 14, wherein the guide assembly includes a nut and a cotter pin, wherein the nut fastens to the guide pin, and wherein the nut and guide pin include holes that receive the cotter pin therein.

16. The seal assembly of claim 10, wherein the carbon face seal is press fit into an inner diameter portion of the seal carrier, and wherein the carbon face seal faces radially inward.

17. A method of removing a carbon face seal from a gas turbine engine, the method comprising:
    providing a seal carrier connected to a spring carrier, wherein the seal carrier has the carbon face seal disposed therein on an opposing side of the seal carrier than the spring carrier;
    removing one or more fasteners that connect the seal carrier to the spring carrier; and removing the seal carrier with the carbon face seal disposed therein from the spring carrier without removing springs and a guide assembly that connect the spring carrier to a seal support.

* * * * *